United States Patent

[11] 3,582,617

[72] Inventor Robert M. Berler
Westport, Conn.

[21] Appl. No. 795,632
[22] Filed Jan. 31, 1969
[45] Patented June 1, 1971
[73] Assignee Pitney Bowes-Alpex, Inc.
Danbury, Conn.

[54] CODED PUNCHED HOLE DOCUMENT READER
3 Claims, 6 Drawing Figs.

[52] U.S. Cl. .......... 235/61.11E
[51] Int. Cl. .......... G06k 7/10
[50] Field of Search .......... 235/61.113, 61.115, 61.11; 250/219 ID, 219 IDC

[56] References Cited

UNITED STATES PATENTS

| | | | |
|---|---|---|---|
| 2,834,005 | 5/1958 | Kelchledge | 235/61.11UX |
| 2,943,208 | 6/1960 | Shepard et al. | 235/61.11X |
| 2,980,319 | 4/1961 | Clemens et al. | 235/61.11X |
| 3,018,947 | 1/1962 | Harruff et al. | 235/61.11X |
| 3,225,177 | 12/1965 | Stites et al. | 235/61.11 |
| 3,375,348 | 3/1968 | Goldstern | 235/61.11 |
| 3,456,117 | 7/1969 | Ritzert et al. | 235/61.11X |

*Primary Examiner*—Daryl W. Cook
*Attorney*—Arthur J. Plantamura

ABSTRACT: An apparatus for reading intelligence contained on a document in the form of coded punched holes which includes a slot to receive the document and a slit, over which the document is drawn, formed in the slot. A light source wherein the light is collimated and directed through the slit is positioned on one side of the slot. Aligned with the slit on the other side of slot is a light pulse detector means comprising a plurality of photocells. A housing capable of substantially excluding light contains the document receiving slot, the light source and photocell detector.

INVENTOR
ROBERT M. BERLER
BY
Arthur J. Plantamura
ATTORNEY.

INVENTOR.
ROBERT M. BERLER
BY
Arthur J. Plantamura
ATTORNEY.

CODED PUNCHED HOLE DOCUMENT READER

This invention relates to a device for reading coded information by optical means from a document containing data in a punched hole coded format.

Among the many fields in which data handling poses a severe problem is that of merchandise inventory and while it will be apparent that the present invention may find advantageous applications in various other areas which are confronted with a burdensome volume of activity, the present invention will be primarily described in conjunction with tagged article inventory such as merchandise, and especially apparel, for example.

Currently there is an excessive amount of manual work and usually a costly time lag involved in the processing of information concerning sales of items and consequently in ascertaining accounts of remaining inventories. This poses a substantial problem to centralized accounting offices and to management which is charged with the responsibility of assuring adequate salable stock and with preventing excessive inventory. The present invention greatly facilitates the processing of the needed information to the appropriate office charged with responsibility for taking action, such as the resupplying of depleted stock.

It is an object of this invention to provide an improved reader for data handling systems.

It is another object of the invention to provide a punched hole document reader capable of reading documents of different lengths.

It is still another object of the invention to provide a card or ticket reader which may be used manually and which is capable of accepting information from a ticket or card which may remain fastened to merchandise.

It is another object of the invention to provide a reader which, because it uses direct light transmission through holes in opaque material, has excellent signal to noise ratio.

These and other objects of the present invention will become more fully apparent from the following specification and claims when considered in conjunction with the accompanying drawing wherein:

The apparatus of the present invention is an optical ticket or card reader that reads a punched hole coded format by optical means. Although it will be apparent that the reader of this invention can be adapted to read various types of punched cards, the present invention will be described in connection with a punched ticket type format, for example such as that known as the "OHR-TRONICS SYSTEM 80" which is basically the teletype punched tape ticket format and is available commercially from Mohawk Data Sciences Corporation. The coding used in the reader of the invention, however, is a modified binary code—the 1, 2, 4, 7, and check digit. Both the teletype punched tape and Ohr-tronics type merchandise ticket have sprocket holes punched down along the center of the coded punched hole region. These sprocket holes are normally used for ticket feed propulsion. However, the sprocket holes are not employed for propulsion in the reader of the invention.

Figure 4:
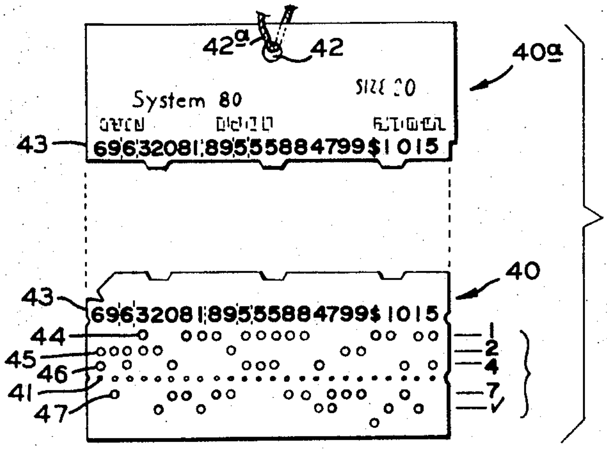
FIG. 4 is one form of a conventional ticket with coded information a portion of which may be severed and inserted into the reader of the invention.
Figure 5:
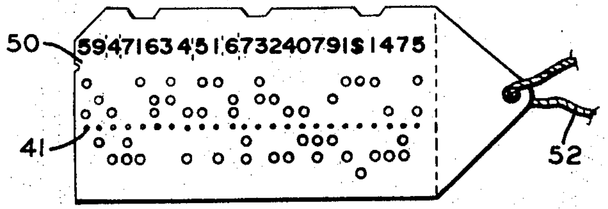
FIG. 5 illustrates another ticket which may be secured or with a stringed tag to merchandise and inserted in the reader without removing the ticket from the merchandise.

In using the reader of the present invention, a ticket of the kind shown in FIGS. 4 and 5 is inserted and after bottoming as evidenced by appropriate impulse, is withdrawn manually from the slot. When the ticket is properly bottomed, a condition whose ascertainment will be described hereafter, it is decoded optically during the withdrawal movement.

Figure 1:
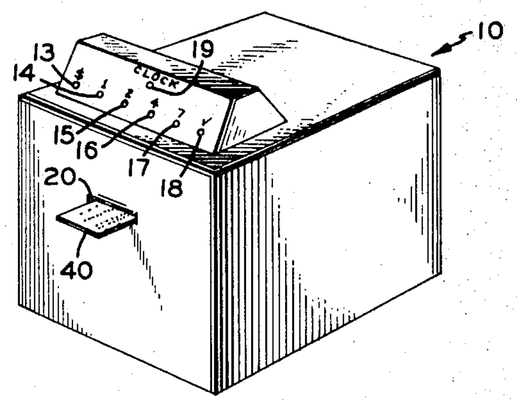
FIG. 1 is a perspective view of the reader package.

Referring to FIG. 1 of the drawing, it is seen that the reader comprises a suitable housing 10 designed to substantially exclude stray light from reaching the photoelectric detector contained therein. The housing may be equipped with appropriate indicator lights 14—19 or other means to signal the user visually whether a valid ticket readout has registered, i.e. whether a ticket 40 has bottomed and has been properly withdrawn from the slot 20. However, such lights are not necessary; these lights merely serve to illustrate visually the manner in which the reader is able to read the punched holes on the ticket by comparing the indicator lamp readout against the human readable number usually found printed at the edge of each row of punched holes. Any reasonable additional special printed symbol such as the dollar sign may be included and provided with an indicator light 13. Obviously, such lights are optional only; in use, the reader, with or without the signal lights, feeds the coded impulse directly into a computer decoder.

Figure 2:
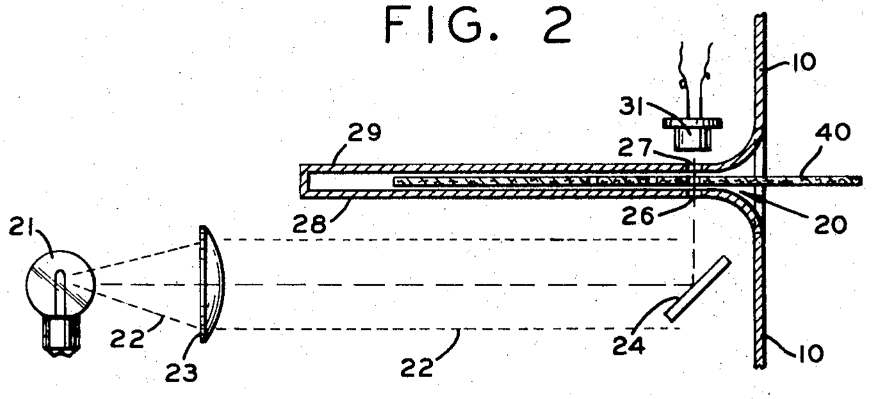
FIG. 2 is a schematic diagram of the functional elements of the reader of the invention.
Figure 3:
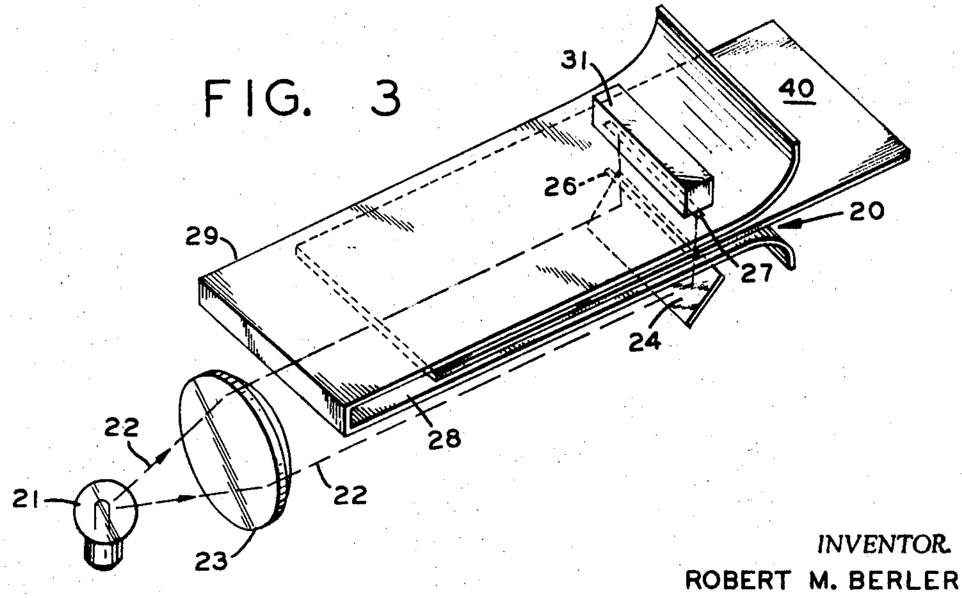
FIG. 3 is another view illustrating the functional elements in perspective.

Referring more particularly to FIGS. 2 and 3 light 22 emitted from a lamp 21 which preferably is derated to extend its life is passed through a collimating lens 23, then onto a mirror surface 24 which reflects the light through a pair of slits 26 and 27 formed in the face plates 28 and 29 respectively which comprise the ticket slot 20 and then into the photoelectric cell array 31. When a ticket 40 is placed into the slot 20, the coded holes punched in the ticket will become light gates. When a portion of the ticket having no holes, is positioned between the two light slits 26 and 27 in the ticket slot 20, no light will be admitted to the particular photocell of the array 31 in that location. As the ticket 40 is extracted from the slot 20, a hole will eventually line up with the light slits 26 and 27, permitting light 22 to pass through to one or more of the photocells in the array 31. For every position across the ticket 40 where a hole can exist, i.e. for every row of holes, there is a mating photocell position for the 1, 2, 4, 7, check digit, and a clock hole located along the upper light slit. The arrangement of FIGS. 2 and 3 is contained in the housing 10 so that stray light from lamp 21 is suitably shielded from reflecting on the photocells in array 31 except through the slits 26 and 27.

Referring to FIGS. 4 and 5 the punched document may comprise a conventional ticket (FIG. 4) used commercially on articles of merchandise. Generally, such tickets comprise a plurality of detachable segments, two only of which are shown, segment 40 which is inserted into the reader and **40*a* which is retained secured usually by a string tied to the hole 42 to the merchandise. Only the detachable part 40 is machine readable. Such tickets carry both human readable information shown at line 43 and machine readable coded information depicted in a plurality of rows 44—47 of punched holes in addition to the row 41** of relatively smaller sprocket holes.

The ticket depicted in FIG. 5 carries similar intelligence i.e. both human readable and machine readable code. However ticket 50 differs in that it is designed to be inserted into the reader while still secured by its string attachment 52 to the merchandise. While it is, of course, also appropriate to secure detachable portions (not shown) similar to the kind shown in FIG. 4 at the sides of the ticket 50 of FIG. 5, it is preferably contemplated that because the ticket 50 may readily be inserted into the reader at the merchandise counter (or merchandise return counter) no additional detachable segments of this kind are required or desired.

When a punched ticket of the kind shown is inserted into the slot 20, upon withdrawal, the ticket will be decoded optically. Because the ticket is processed manually, the sprocket holes 41, which are normally used for ticket feed mechanisms, have no use for that purpose in the reader of the invention. The sprocket holes, however, are made to serve as a ticket validating clock in the device of the present invention since they are in alignment with each row of coded holes.

Valid ticket readout will be determined by counting clock pulses provided by sprocket holes 41. Any count which is less or greater than the correct prescribed count of these sprocket holes will register as a "NO-GO" and be rejected. In addition, a check digit will be used to insure that numbers read out will be legitimate. For this purpose, the 1, 2, 4, 7, binary code and check digit referred to hereinabove is employed. Any number can be represented by a combination of either: (a) any single number and a check digit, or (b) by a combination of two number digits less the check digit in the range from 1 to 9. A zero is represented by the combination of the 4 and 7 digits. Thus there will always be three holes admitting light to the photocells when the clock hole is included, for every number read out.

A special hole combination must be provided on the ticket for the following reasons:

1. A means must be provided to indicate that the ticket has been inserted all the way into the slot.
2. A signal must be provided to indicate when the clock count can start.
3. A means to determine when the proper clock count has been achieved.

For this purpose, for example, a chosen hole combination may be a 4, 7, and clock in combination with a check digit hole. This combination will never show up any other time than when used for this purpose, i.e. this would be the only time four indicators would be lit on the reader. The physical position on the ticket for this special combination will be the first holes to be punched out next to the part of the ticket which is held by the fingers of the operator, thus, in order to provide a signal "start clock count," the ticket must be fully inserted into the slot so that the special combination holes of 4, 7, check and clock may be read out of the photocells.

As the ticket is extracted from the slot, the clock signals are counted electronically while the hole code is being read out at the same time.

A time delay circuit must be provided which will insure that the correct clock count was received. This time delay might be one-half second long. If the correct clock count occurs, and no other clock pulses are received after one-half second, then the code on the ticket will be processed. If, on the other hand, less or more than the correct clock count is indicated at the end of one-half second time delay, the readout will be invalid and therefore rejected. The ticket must then be reinserted and extracted once again.

The following reasons can cause an improper ticket readout:

1. Ticket not fully inserted before being withdrawn from slot.
2. Inserting ticket all the way in and then jiggling it back and forth causing a greater clock count to be generated.
3. Defective ticket.
4. Defective punched holes.

In the case of a defective ticket or holes, the information must then be manually entered into the computer.

Figure 6:
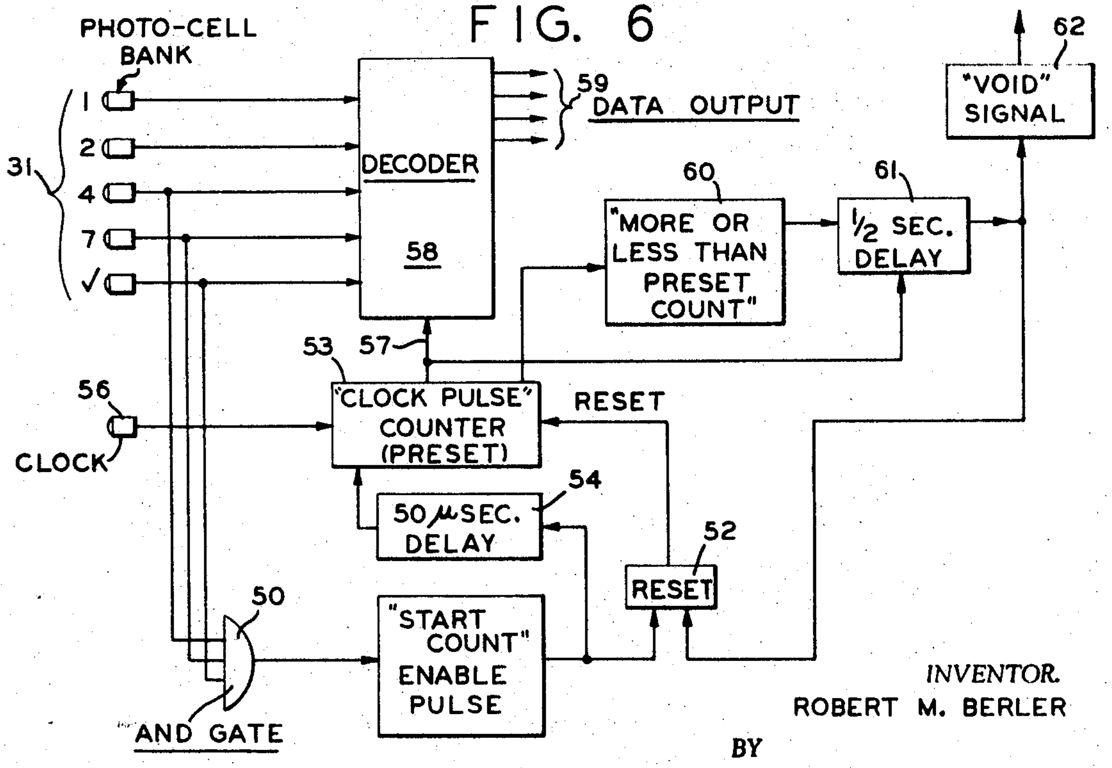
FIG. 6 is a block diagram depicting logic circuits useable with, and aiding in better understanding the functioning of, the reader of the invention.

Referring to FIG. 6, an illustrative circuit and logic which can be used with the ticket reader is represented. It will be apparent that the actual circuit may be varied, within the purview of one skilled in the art, from the one shown in FIG. 6, but the principle of operation essentially will be the same.

The outputs of the 1, 2, 4, 7, and check digit photocells are fed into the decoder 58. The output of the clock photocell 56 is fed into a clock pulse counter 53. The outputs of the 4, 7, and check photocells also feed into an "AND" gate 50.

Operation of the system is as follows:

When the ticket is fully inserted so that the 4, 7, and check photocells in bank 31 produce an output, the "AND" gate 50 will be enabled. This will initiate a start count pulse at 51 which will cause a reset pulse at 52 to immediately reset the clock pulse counter 53, and a short time later e.g. 50$\mu$ sec. through delay 54 signals the clock pulse counter 53 that it can now count clock pulses when they arrive from the clock photocell 56. The 50$\mu$ sec. delay allows sufficient time for the counter 53 to be reset before it receives the start count pulse.

Each time that an output from the clock photocell 56 is present, a "READ PULSE" 57 will be present at the output of the clock counter 53. Only when this READ PULSE is present at the input of the DECODER 58, can an output or readout be taken from the decoder output 59. In the absence of a Read Pulse 58, the Decoder 58 will reset itself. The output of the clock counter 53 also is fed into a circuit 60 which determines if the clock count is less or greater than the preset value. If the clock count agrees with the preset count, no output will be produced from this circuit; the count will be correct and usable. However, if this circuit produces an output, a "VOID" signal will be generated at 62 after a half second through delay 61 which activates a "NO-GO" alarm, and all circuits are reset. (Most tickets will be pulled out of the reader in less time than a half second.)

If a ticket is inserted fully into the slot 20, and then pulled out partially, and then left there, the circuits will again be automatically reset in half a second.

It is thus seen that the apparatus of the present invention is a highly practical tool that possesses many advantages including, for example:

1. The signal to noise ratio is excellent as a result of direct light transmission through holes in opaque material.
2. It is capable of processing long as well as short tickets as a result of "START COUNT" code near the finger held portion of the ticket. This allows intermixed lengths of tickets to be processed if necessary.
3. It is far less expensive to manufacture than other readers because:
   *a.* A motor and associated mechanics are not required since the reader of the invention uses hand propelled tickets, i.e. it is manually operated.
   *b.* Special lamps for hole illumination are not required. A single, inexpensive, ruggedized standard lamp is used.
   *c.* The system comprises simple optics, i.e. a simple lens and mirror.
   *d.* With the exception of the manually fed ticket, there are no moving parts in the reader.
   *e.* The materials of construction and fabrication of the reader are inexpensive.
4. The light bulb has a rated life of 12 years when operated 24 hours per day.
5. The reader is mechanically and electrically rugged.
6. It is compact and admirably suited for use as an "ON-LINE" reader at point of sale checkouts in retailing.

While the invention has been described with reference to a number of particulars in order to give a full and clear explanation, various modifications will be apparent to those skilled in the art without departing from the scope and spirit of the invention.

What I claim is:

1. An apparatus for reading a document upon which information is coded in a pattern, comprising a plurality of discrete punched holes, said apparatus comprising a slot to manually insert said document and from which the document is withdrawn as it is being read, an opening in said slot, a light source arranged on one side of said slot, a light collimator positioned to direct parallel light rays from said light source through said opening, detector means comprising a plurality of photocells positioned in alignment with said opening and light rays but on the opposite side of said slot from the light source, each photocell being separately but simultaneously responsive to light passing through said opening and through the punched holes of a document inserted in said slot, said photocells providing electrical signals representative of the pattern of holes punched in said document, document registration means, an electronic indicator means to assure registration of the document inserted in said slot before it is withdrawn for reading, and a suitable housing, capable of substantially excluding stray light, enclosing said ticket receiving slot, light source and detector means.

2. An apparatus in accordance with claim 1 wherein said registration means comprises a predetermined special combination of punched holes and corresponding electrical signals.

3. An apparatus in accordance with claim 2 further provided with a time delay circuit which is preset to validate a reading of said document as it is withdrawn from said slot a set time interval after registration.